United States Patent [19]

White, Jr.

[11] Patent Number: 5,080,567

[45] Date of Patent: Jan. 14, 1992

[54] GERATOR HYDRAULIC DEVICE HAVING SEAL WITH STEEL AND RESILIENT MEMBERS

[75] Inventor: Hollis N. White, Jr., Hopkinsville, Ky.

[73] Assignee: White Hydraulics, Inc., Hopkinsville, Ky.

[21] Appl. No.: 443,498

[22] Filed: Nov. 30, 1989

[51] Int. Cl.⁵ .................... F03C 2/08; F04C 2/10; F04C 15/00; F16J 15/28
[52] U.S. Cl. .................... 418/61.3; 418/142; 277/92; 277/235 R
[58] Field of Search ............ 418/61.3, 142, 144, 418/166, 171; 277/92, 165, 235 R

[56] References Cited

U.S. PATENT DOCUMENTS

| | | | |
|---|---|---|---|
| 3,379,480 | 4/1968 | Storm | 277/235 |
| 3,389,921 | 6/1968 | Lojkutz | 277/92 |
| 3,452,680 | 7/1969 | White, Jr. | 418/61.3 |
| 3,894,821 | 7/1975 | White, Jr. | 418/142 |
| 4,116,593 | 9/1978 | Jones | 418/142 |
| 4,298,318 | 11/1981 | Tsuchiya et al. | 418/61.3 |

Primary Examiner—John J. Vrablik
Attorney, Agent, or Firm—Woodling, Krost & Rust

[57] ABSTRACT

A seal utilizing a two part construction of a rubber resilient body and a steel sealing wear member for use in a cavity to create a seal between two parts that have relative motion in respect to each other.

10 Claims, 2 Drawing Sheets

GEROTOR HYDRAULIC DEVICE HAVING SEAL WITH STEEL AND RESILIENT MEMBERS

Gerotor hydraulic devices are recognized in the field as being a preferred method of developing power in low speed, high torque applications. This include wheel drive, auger drives, scissors lifts, and other similar applications. Hydraulic motors are disclosed in the U.S. patent application Nos. 3,606,601 and 4,697,997. Hydraulic motors, however, need to have sealing contact at surfaces between an orbiting and/or rotating part and a stationary part. This sealing contact is difficult to provide due to the problems with the eccentric and/or rotary motion between these two parts, as well as the need to compensate for temperature induced dimensional changes in the various parts. In addition there is a possible passage over holes such as valving openings that may damage the seals. Due to these difficulties, most gerotor designers utilize a minimum number of seals between eccentric parts. These designers instead design in the tolerances of 0.002-3 to as little as 0.0001 inch clearance between the parts and utilize this reduced clearance as the seal. This design is serviceable. However, it still allows a certain amount of fluid to bypass through the clearance. This bypass reduces the efficiency of the gerotor mechanism from what it otherwise would be. In addition the dimension of the device becomes more critical in the design.

OBJECTS

It is an object of this invention to provide for a high reliability mechanical seal between parts moving in an eccentric or other manner in respect to each other.

It is an object of this invention to reduce the leakage between parts having eccentric or other motion in respect to each other.

It is an object of this invention to increase the efficiency of gerotor motor hydraulic devices.

It is an object of this invention to increase the longevity of gerotor motor hydraulic devices.

It is an object of this invention to increase the volumetric and mechanical efficiency of gerotor motor hydraulic devices.

Other objects, and a more complete understanding of the invention, may be had by referring to the drawings and specifications in which:

FIGURES

Figure 1:
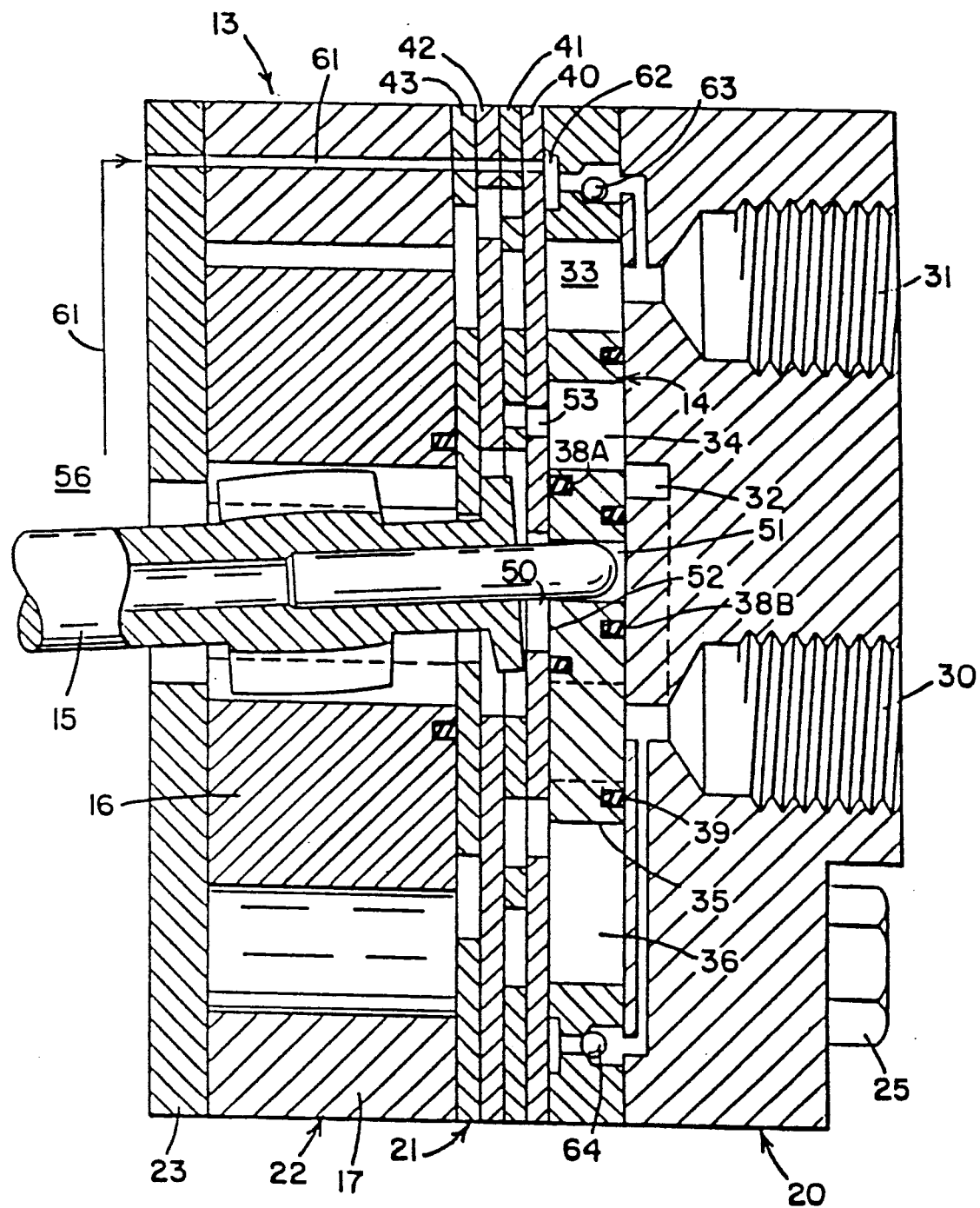
FIG. 1 is a longitudinal cross-sectional view of a gerotor hydraulic device incorporating the improved seal of this application.
Figure 2:
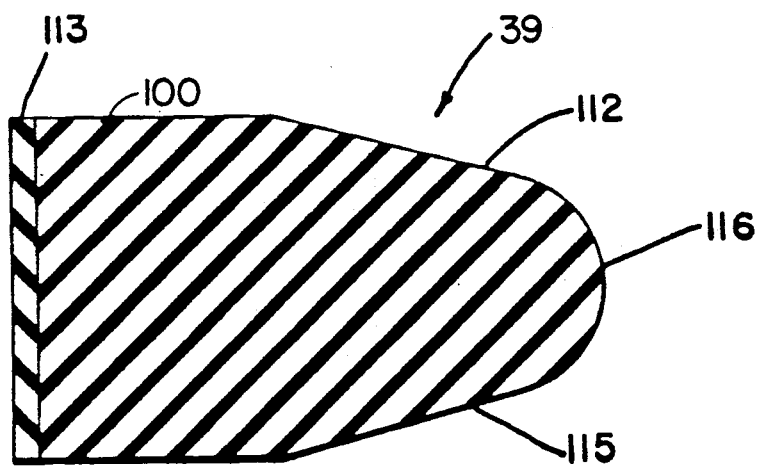
FIG. 2 is an enlarged cross-sectional view of one of the improved seal members of FIG. 1; and, FIG. 3 is an enlarged cross-sectional view of one of the improved seal members in position in the application as utilized in FIG. 1.
Figure 3:
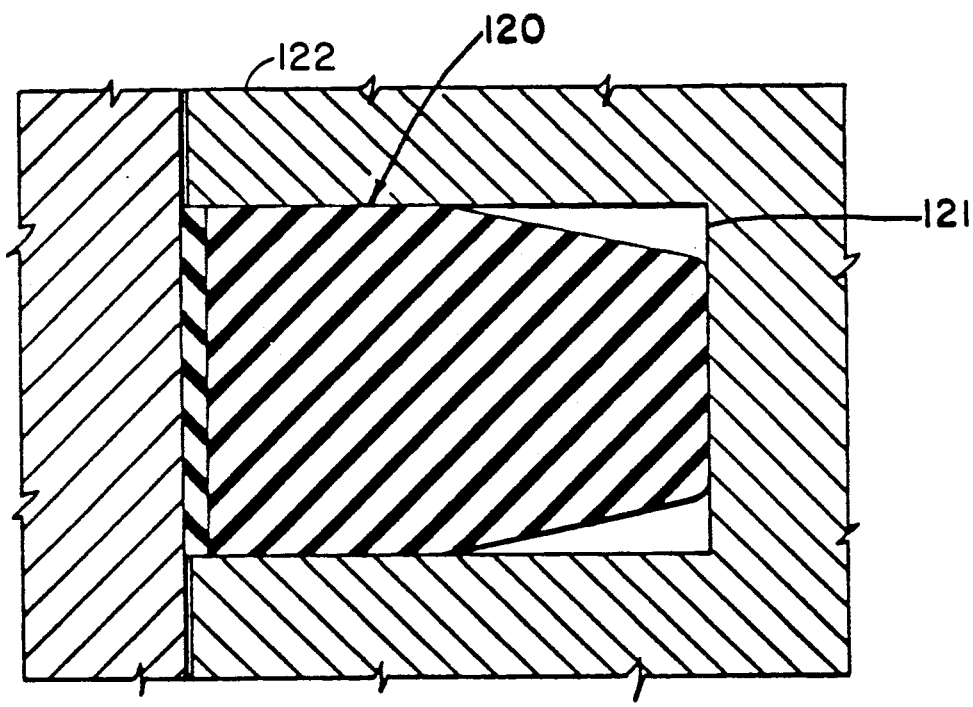

This invention relates to an improved seal. The invention will be described in the preferred environment of a gerotor motor/pump (not shown) having a housing (not shown) containing a drive shaft (not shown) connected to a gerotor structure 13 and rotary valve 14 via a wobble stick 15 (FIG. 1). The environment of the invention in a similar complete gerotor motor is described in my U.S. application No. 282,675 filed Dec. 12, 1988—a device having a sealed control opening and an orbiting valve—issue fee paid Aug. 14, 1989, U.S. Pat. No. 4,877,383 (incorporated herein by reference). This gerotor device can produce power when fluidically connected as a motor to a source of high pressure or it can produce high pressure fluid when physically connected as a pump to a motor or other source of rotary power. The device is described as a motor.

The drive shaft is located in the housing for rotation in respect thereto. In this gerotor motor, as in that disclosed in Mr. White's prior application No. 282,675, U.S. Pat. No. 4,877,383 or the U.S. Pat. No. 4,697,997, the speed and direction of rotation of this shaft 12 is governed by the volume, pressure, and direction of flow of the fluid through the gerotor structure 13.

The gerotor structure 13 itself includes an end plate 20, a manifold plate 21, a gerotor device 22, and a balancing plate 23 fixedly attached together so as to produce a single integral unit (by bolts). The gerotor device shown is a rotor 16 within a stator 17 (FIG. 1). Other pressure mechanisms could also be used.

The end plate 20 is the termination cap and porting plate for the device 10. Two ports 30 and 31 are machined into the plate 20 so as to form the fluid connections for the device. One port 30 connects to a commutation ring 32 in the opposing face of the plate 20. This commutation ring 32 in turn communicates with the central section 34 of the orbiting valve 14 to provide a fluid connection therefor. The other port 31 connects to a ring-shaped cavity 33 on the opposing side of the plate 20. This cavity 33 surrounds the outside circumferential edge 35 of the orbiting valve 14 to provide a second fluid connection to the valve 14.

The orbiting valve 14 is the main valve for the device. The center opening 34 of the valve 14 communicates with one port 30 via the ring 32. The external side about outer edge 35 of the valve 14 communicates with the other port 31. (Due to the fact that there is a space 36 between the outermost position 35 of the orbiting valve 14, fluid is able to freely move about the outside of the valve 14).

The manifold plate 21 is next to the orbiting valve 14 between the valve 14 and rotor 16. The manifold plate 21 serves to connect the center 34 and outer 35 sections of the orbiting valve 14 to the gerotor cells between the rotor 16 and stator 17 selectively as the device is operated. The manifold plate 21 itself is formed as a brazed assembly of four thin stamped plates 40-43.

The pressurized fluid in the embodiment disclosed is segregated to the area of the device near the orbiting valve 14 by the sealing of the wobble stick drive connection to the valve 14. In the preferred embodiment shown, this sealing is accomplished by restricting the effective size of the drive opening 50 through the valving plate 40 of the manifold plate 21 to a size capable of being sealed by the inside drive surface 52 of the valve 14. To accomplish this, the radius of the drive surface 52 of the valve is slightly greater than the radius of the opening 50 plus the offset of the center of the valve 14 from the center of the valve manifold 21. With this relationship, the inside drive surface 52 of the valve 14 will seal the opening 50 throughout the operational valving orbit of the valve 14. Central seals 38 improve the seal against fluid from passing into the wobble stick drive connection at the center of the valve 14. Note that the central seal 38A on the inside of the valve 14 against the valving plate 40 is larger than the central seal 38B of the valve 14 against the porting end plate 20. The reason for this is that the seal 38A seals fluid from the wobble stick drive connection access hole 50 in plate 40. The seal 38A must be a sufficient diameter to continually seal this hole 50 during the entire orbiting motion of the valve 14. The seal 38A must therefore have a radius greater than the radius of the hole 51 plus the amount of orbit offset. Since the hole 50 is of significant diameter, the seal 38A must also have a significant diameter. In contrast, the seal 38B seals the wobble stick of connection 51 to the valve 14. The seal 38B must be of a diameter to continually seal this connection 51 while at the same time fitting within the diameter of the commutation groove 32 in the end plate 20 (so as to not subject the seal to inordinate wear). The seal 38B must therefore have a diameter larger than the connection 51 and also a diameter smaller than the radius of the groove 32. The size of the seal 38B is thus normally different from the size of the seal 38A. An outer seal 39 prevents fluid from passing between the central section 34 of the valve 14 and the space 36 about the outer edge 35 of the valve 14. (Note that any seal 39 on the outer ring of the valve 14 on the opposite side of the valve 14 against the manifold plate 21 would travel over the valve openings 53 for the device, subjecting such seal to wear. In the preferred embodiment shown, the seal at this point is limited to the flat steel of the outer ring of the valve 14; this flat steel provides an acceptable seal without being subject to the wear a separate seal would be. This is especially so given the loading of the flat steel by the seal 39 on the opposing side of the valve 14. The improved seal of the invention could, however, be utilized at this location (and others such as in the rotor) if desired; The improved seal, having no edges or resilient section to catch and traveling along a flat surface, would provide an improved seal at this point at a cost of some longevity.)

Any fluid that does leak through the seals 38 into the central wobble stick cavity is easily drained off: the fluid would be of very low volume. The device shown in FIG. 1 has an internal drain connection for this fluid. In this device a passage 61 connects the central opening 56 to the housing ring-shaped channel 62 in the valve spacing plate. The ring-shaped channel 62 is in turn connected via check valves 63 and 64 operate to selectively connect the ring channel 62 (and thus the central opening 56 the housing 11) to the port 30, 31 having the lowest relative pressure. This provides an automatic internal drain for any excess fluid in the central opening 56.

The wobble stick 15 connects the drive shaft to both the rotor 16 and valve 14 passing rotary and orbital forces.

In its orbiting motion the valve 14 connects the port 30 through the central opening 34 to some gerotor cells of the gerotor device 22 while connecting the port 31 through the surrounding edge 35 to others of gerotor cells of the gerotor device 22 through the manifold plate 21 as is customary for separate orbiting valve devices.

The improved seal 38, 39 of this application includes a body 100 having a resilient section 112 and a integral steel section 113. This seal is located within a generally cylindrical cavity in one of the body parts having an eccentric or other motion relative to the other.

The composition/cross sectional shape of the resilient section 112 of the body 100 of the preferred improved seal is not critical. It is preferred that this section 112 has the properties of a) resiliency; and b) sufficient strength so as to retain the bond with the later discussed steel section.

In the preferred embodiment shown the resiliency is established by the utilization of a 70 Durometer Buna-N material for the section 112 of the seal in combination with a tapered shape. The steel member is bonded to the Buna-N material such that no separation would normally occur. This bonding retains the steel member 113 in its relative position against the rotational forces which are otherwise put on the steel member. This retention reduces the wear on the seal by insuring that any wear that does occur does so between the steel surface and the opposing part and not between the steel member 113 and the resilient section 112. The tapered shape of the resilient member gives the seal a further range of resiliency. In addition to the use of a tapered shape in combination with the rectangular cavity allows the seal a significant range of movement including expansion and contraction within the cavity without otherwise impeding the movement of the seal. This increases the ability of a gerotor designer to design a seal having predictable qualities.

The steel member 113 is the main seal for the gerotor device between the parts having an eccentric motion. The steel member 113 accomplishes this by having effectively zero tolerance or clearance between the steel member and the other part. To provide for this sealing contact, the steel member 113 has the attributes of resistance to abrasion and other desirable surface wear characteristics. It's preferred that the strength of this steel member 113 be significantly greater than the other part of device on which it will be bearing. Note that the steel member 113 has a limited surface area in respect to the area swept by the other part of the device. For this reason the sealing loads are spread out on the other part of the device instead of concentrated as in the steel member 113. This spreading/traveling contact is the primary reason that the other part of the device can be of a softer material than the steel member 113. In the preferred embodiment shown, the steel member has a hardness of above RC-35 with RC-60 preferred and the hardness of the part upon which it will bear (the housing part 20 or the plate 40) is much softer at approximately RB-80. The use of steel for the critical sealing function eliminates most consideration for the temperature of the device (i.e. plastic etc. or something else that might have its strength compromised by the 200° F. typical temperature for gerotor devices).

The dimensions and strengths for the seal of this invention are selected in order to match its application.

The particular preferred seal 39 disclosed has a resilient member 112 with an unstressed overall inner diameter from 1.628 to 1.630 inches, an outer diameter from 1.747 to 1.749 inches, and a depth from 0.097 to 0.099 inches. The sides 115 of the resilient member 112 are tapered at 15° after a distance from 0.040 to 0.042 inches from one end thereof. The 15° taper leads to an end 116 having a radius of 0.030 to 0.032 inches. The steel member 113 has an overall inner diameter and outer diameter the same as the resilient member 112 and a depth from 0.009 to 0.011 inches. The preferred seal 38B has a resilient member 112 with an unstressed overall inner diameter from 0.375 to 0.377 inches, and an outer diameter from 0.497 to 0.499 laches. (The other dimensions are the same as the seal 39.) These dimensions have been found to provide a good combination of strength vs. resiliency for the seals as previously discussed. The steel member 113 preferably has a hardness of from RC-35 to RC-60.

The cavity 120 in the part which cooperates with the seal is designed to hold the improved seal in position in respect to the eccentric forces imparted to the steel member of the seal while at the same time providing a surface 121 against which the resilient member can bear to hold the steel member 113 in contact with the other part. This insures that the seal remains in place in respect to the part while at the same time providing a good sealing contact with such part throughout the life of the seal. In the preferred embodiment shown, the cavity is a generally rectangularly shaped cavity having a width substantially equal to the width of the steel member, and having a depth a little less than the total dimension of the improved seal including body 100 and steel member 113. The width of the cavity 120 retains the steel member 113 in place in respect to the eccentric or sideways forces put on such member 113 during the operation of the device, while at the same time allowing a piston-type motion of the steel member in and out of the cavity. The depth of the cavity is designed to insure that the steel member 113 protrudes slightly out of the surface of the part 122 containing the cavity, also providing a support for the sides of the steel member 113, while at the same time providing enough surface area between the resilient member and either the sides or the bottom of the cavity, so as to allow the resilient member to expand and contract while holding the steel part in position in respect to the rotational forces put on such steel part by the eccentric and/or rotary motion between the first and second moving parts. In the preferred embodiment shown, the cavity has a rectangular cross-section with a depth slightly less than the depth of the uncompressed resilient member such that the steel member just barely engages the sidewalls of the cavity in the member's uncompressed state. This relationship facilitates the construction of the device by insuring that no special concern need be taken for the seal during the assembly of the device. This is done by having the steel member seated in respect to the cavity in the unstressed unassembled position. After assembly, this sidewall contact is preferably increased to support the sides of the steel member 113.

The particular improved seal 39 dimensioned earlier is designed to be utilized in a cavity having an inner diameter from 1.623 to 1.625 inches, an outer diameter from 1.752 to 1.754 inches, and a depth from 0.1002 to 0.1004 inches. The dimensions for the cavity for the preferred seal 38B are an inner diameter from 0.370 to 0.372 inches, an outer diameter from 0.502 to 0.504 inches and a depth from 0.1002 to 0.1004 inches.

With these dimensions, the steel member 113 can be seated within the cavity 120 during assembly with the assembly compressing the resilient member 112 so as to preload the steel member 113 into sealing contact with the associated part (note again that it is preferred that the depth of the steel member 113 be greater than the maximum distance between the two moving parts so as to reduce the shearing loads on the steel/resilient member bond).

Although the invention has been described in its preferred form, with as certain degree of particularity, it is to be understood that numerous changes could be made without departing from the invention as hereinafter claimed. For example the seal could be utilized in a purely rotational application, the steel member could be made of ceramic, or other changes made.

What is claimed is:

1. In a gerotor hydraulic pressure device having two parts having relative motion at a common plane, an improved seal, said seal comprising a cavity, said cavity being in one of the two parts, a seal, said seal having two sections, one section of said seal being a steel member and the other section of said seal being a resilient member, said steel member being located next to said resilient member, said seal being in said cavity in said one part with part of said steel member outermost protruding therefrom in sealing contact against the other part, said steel member having a width, said cavity having a width and said width of said steel member being substantially equal to said width of said cavity.

2. The gerotor hydraulic pressure device of claim 1 characterized in that said steel member has a hardness above RC-35.

3. The gerotor hydraulic pressure device of claim 1 characterized in that the other part has a hardness below RC-35.

4. In a gerotor hydraulic pressure device having two parts having relative motion including non-rotary motion at a common plane, an improved seal, said seal comprising a cavity, said cavity being in one of the two parts, a seal, said seal having two sections, one section of said seal being a steel member and the other section of said seal being a resilient member, said steel member being located next to said resilient member, said seal being in said cavity in said one part with part of said steel member outermost protruding therefrom in sealing contact against the other part, said steel member having an inner and outer radial surface, said cavity having an inner and outer radial surface and said inner radial surface of said steel member bearing against said inner surface of said cavity or said outer surface of said steel member bearing against said outer surface of said cavity so as to hold said steel member into position against the non-rotary forces caused by the non-rotary motion between the two parts.

5. In a gerotor device having two parts having relative orbital motion in respect to each other, an improved seal, said seal comprising a cavity, said cavity being formed in one of the two members, said cavity having a width and a depth, a steel member, a resilient member, said resilient member being bonded to said steel member, said resilient member having a depth, said depth of said resilient member being less than said depth of said cavity, said steel member having a width, said width of said steel member being substantially equal to said width of said cavity, said seal being within said cavity with said resilient member innermost and with said steel member protruding from the opening of the cavity and pressing against the other part.

6. In a gerotor hydraulic pressure device having two parts having relative motion including non-rotary motion at a common plane, an improved seal, said seal comprising a cavity, said cavity being in one of the two parts, a seal, said seal having two sections, one section of said seal being a steel member and the other section of said seal being a resilient member, said steel member being located next to said resilient member, said steel member being bonded to said resilient member, said seal being in said cavity in said one part with part of said steel member outermost protruding therefrom in sealing contact against the other part, said steel member having an inner and outer radial surface, said cavity having an inner and outer radial surface and said inner radial surface of said steel member bearing against said inner surface of said cavity and said outer surface of said steel member bearing against said outer surface of said cavity so as to hold said steel member into position against the non-rotary forces caused by the non-rotary motion between the two parts.

7. The gerotor hydraulic pressure device of claim 6 characterized in that said steel member has a hardness above RC-35.

8. The gerotor hydraulic pressure device of claim 6 characterized in that the other part has a hardness below RC-35.

9. The gerotor hydraulic pressure device of claim 6 characterized in that said seal has a depth, said cavity having a depth and said depth of said seal being longer than said depth of said cavity.

10. The gerotor hydraulic pressure device of claim 6 characterized in that said resilient member has a side and an end, and said side of said resilient member being tapered near to said end.

* * * * *